United States Patent [19]

Kovach

[11] Patent Number: 4,521,528

[45] Date of Patent: Jun. 4, 1985

[54] PREPARATION OF ZIRCONIUM PHOSPHATE ACTIVATED CARBON ADSORBENT

[76] Inventor: Julius L. Kovach, 2948 Brookdown Dr., Worthington, Ohio 43085

[21] Appl. No.: 546,371

[22] Filed: Oct. 28, 1983

[51] Int. Cl.$^3$ .................. B01J 27/14; B01J 31/02; B01J 27/20

[52] U.S. Cl. .................. 502/208; 502/150; 502/180; 502/417; 502/418; 502/425

[58] Field of Search .............. 502/150, 180, 208, 417, 502/418, 425

[56] References Cited

U.S. PATENT DOCUMENTS

| | | | |
|---|---|---|---|
| 3,365,405 | 1/1968 | Fukui et al. | 502/208 X |
| 3,864,277 | 2/1975 | Kovach | 502/425 |
| 3,878,564 | 4/1975 | Yao et al. | 3/1 |
| 3,944,622 | 3/1976 | Okamoto et al. | 260/593 R |
| 3,966,822 | 6/1976 | Fukui et al. | 260/593 R |
| 3,994,799 | 11/1976 | Yao et al. | 204/301 |
| 4,069,232 | 1/1978 | Horwitz et al. | 260/343.6 |
| 4,240,376 | 12/1980 | Kominami et al. | 119/2 |
| 4,409,418 | 10/1983 | Johnson et al. | 502/208 X |
| 4,430,207 | 2/1984 | Kuber | 302/208 X |

FOREIGN PATENT DOCUMENTS 0011878  6/1977  Hungary .

OTHER PUBLICATIONS

"Sorbents in the Treatment of Chronic Renal Disease", Maxwell et al., Dept. of Med., Cedar Sinai Medical Center, L.A., Calif., 1975.

"In Vitro Adsorption of Oxalic Acid and Glyoxylic Acid onto Act. Charcoal, Resin and Hydrous Zirconium Oxide", The International J. of Artificial Organs, vol. 5, No. 1, 1982.

*Primary Examiner*—William G. Wright
*Attorney, Agent, or Firm*—Mueller and Smith

[57] ABSTRACT

The present invention is directed to a method for preparing a homogenous activated carbon/zirconium or hafnium phosphate product in situ which comprises mixing a carbonaceous organic material with a zirconium or hafnium compound and a phosphoric acid or phosphate salt, and heat-treating said mixture under conditions to convert the carbonaceous material into activated carbon and to convert the zirconium or hafnium compound into zirconium or hafnium phosphate. Advantageously, a molar excess of phosphoric acid over that required to convert the zirconium (or hafnium) compound into zirconium (or hafnium) phosphate is used. Advantageously, also, the heat-treated mixture is washed to remove excess phosphoric acid and dried to remove moisture. Another advantageous embodiment of the invention comprises forming the mixture into a desired shape prior to its heat-treating.

10 Claims, No Drawings

PREPARATION OF ZIRCONIUM PHOSPHATE ACTIVATED CARBON ADSORBENT

BACKGROUND OF THE INVENTION

The present invention relates to the production of zirconium phosphate/activated carbon adsorbents and more particularly to a novel and improved homogeneous adsorbent of zirconium phosphate and activated carbon.

The unique and valuable properties of zirconium phosphate adsorbents at high temperatures at both high and low pH values and in the presence of oxidizing and reducing agents has been well established. Zirconium phosphate, for example, is a useful inorganic ion exchanger which can be used in chromatographic techniques for the selective separation of, for example, alkali metals for use in the nuclear processing industry. Zirconium phosphate has particular advantage over other metal complexes because of its stable valence state and its recalcitrance to dissociate from the phosphate under variable reaction conditions. Also, zirconium phosphate is non-toxic and relatively inexpensive.

A practical problem in using of zirconium phosphate alone is its tendency to form colloidal gels when exposed to aqueous electrolytic solutions. Another problem in use of zirconium phosphate by itself is its porosity, that is, the internal surface area of zirconium phosphate is unstable. These problems have been overcome by depositing the zirconium phosphate or other zirconium salt on an inert carrier, such as activated carbon. Activated carbon is the carrier of choice because it is well suited as an ionic exchanger support due to its high surface area, its relatively inexpensive manufacturing costs, and its ability to exhibit some ion exchange behavior itself.

Prior techniques for preparing the zirconium phosphate/activated carbon adsorbents have involved the impregnation of activated or oxidized carbon with zirconium phosphate. The impregnation typically is accomplished by treating the activated or oxidized carbon with a water-soluble zirconium salt followed by the conversion of the deposited zirconium salt to its phosphate by washing with phosphoric acid. Such processes are limited by the available pore structure of the starting carbon and by the heterogenity of the product. Accordingly, only a limited amount, eg. up to about 15% by weight, of zirconium phosphate can be deposited on the carbon adsorbent. With specific reference to the preparation of such zirconium phosphate activated carbon adsorbents and their use, reference is made to the following citations:

1. Hungarian Pat. No. 11878 (1977)
2. Akatsu et al. "Radiochemical study of adsorption behavior of inorganic ions on Zirconium Phosphate Silica Gel and Charcoal", *J. Nucl. Sci. and Tech.*, 2, 141, 1965.
3. Shiao, S. Y., Johnson, J. S. "Preparation of Activated Carbons filled with hydrous Zr (IV) oxide" p. 143 USDOE Document ORNL-5816 (1982).
4. Shiao, S. Y., et al., *J. Inorg. Nucl. Chem* (1982)
5. Nagy, L. G. et al. "Preparation of Zirconium Phosphate on Support Material and its Application for the Sorption of Some Radioions", *J. Radio and Chem.*, 58, 215–220 (1980).
6. Amphlett, C. et al., *J. Inorg. Nucl. Chem*, 10, 69 (1969)
7. Mohiuddin, G. Et al "Ion exchange behaviour of alkali metals on treated carbons" USDOE Document ORNL//MIT-351 (1983).

The present invention is directed to an improved method for preparing the activated carbon/zirconium phosphate adsorbents and to a resulting novel product.

BROAD STATEMENT OF THE INVENTION

The present invention is directed to a method for the in situ preparation of a homogeneous activated carbon/zirconium phosphate or hafnium phosphate product. Such method comprises mixing a carbonaceous organic material with a zirconium or hafnium compound and a phosphoric acid or phosphate salt. The mixture then is heat-treated under conditions to convert the carbonaceous material into activated carbon and to convert the zirconium or hafnium compound into zirconium phosphate or hafnium phosphate. The homogeneous adsorbent product optionally may be washed for removal of excess phosphoric acid and/or dried to any desirable moisture content. The adsorbent additionally may be formed into any desirable shape prior to the heat-treating step.

Another aspect of the present invention is the resultant novel improved activated carbon/zirconium or hafnium phosphate adsorbent. Such adsorbent comprises a homogeneous mixture of activated carbon and zirconium or hafnium phosphate which mixture has been simultaneously prepared in situ. Any arbitrary proportion of zirconium or hafnium phosphate may be included in the novel adsorbent of the present invention.

Advantages of the present invention include the ability to produce an activated carbon adsorbent which contains a proportion of zirconium phosphate which can be easily adjusted to any desirable content. Another advantage is the ability to prepare such adsorbents which contain zirconium or hafnium phosphates in proportions much greater than heretofore was possible. These and other advantages will be readily apparent to those skilled in the art based upon the disclosure contained herein.

DETAILED DESCRIPTION OF THE INVENTION

The preparation of activated carbon is a well practiced and known commercial process. Starting materials preferably are made from the chemical elements carbon, oxygen, and hydrogen and can be supplied in any form capable of carbonization in the presence of the other components of the starting mixture, eg. phosphoric acid or a phosphate salt. An advantageous method for making such activated carbon adsorbent can be found in U.S. Pat. No. 3,864,277, the disclosure of which is expressly incorporated herein by reference. As such patent points out, it is economical to use normal waste products, such as sawdust or fine powder residues, which are not high in inorganic content and which can interface with the end product use. Pure organic compounds, however, can be used also. Such pure organic compounds include, for example, sugar, starch, and the like. Thus, the carbonaceous organic material of the mixture of the present invention can be termed an activated carbon precursor.

Zirconium and hafnium form disubstituted phosphates. Elinson and Petrov, "Analytical Chemistry of Zirconium and Hafnium", Ann Arbor, Humphrey Science Publishers (Ann Arbor, Mich., 1969). Such phosphates are formed by reacting a zirconium or hafnium compound with phosphoric acid. A phosphate salt additionally may find use in such process and is included for purposes of the present invention. Suitable zirconium or hafnium compounds for use in preparing the novel homogenous activated carbon adsorbent of the present invention are soluble or dispersible in water because water is utilized in the activated carbon manufacturing process. Desirably, an oxide or halide salt is utilized, though other known zirconium or hafnium salts may be used as is necessary, desirable, or convenient in conventional fashion. Of importance and uniqueness to the present invention is the ability to adjust the proportion of zirconium or hafnium to a preselected value based upon end use of the product, for example. Thus, the novel homogenous adsorbent of the present invention may contain 30%, 50%, or greater of zirconium or hafnium phosphate by weight of the adsorbent. Prior art impregnation processes cannot readily control the desired amount of zirconium or hafnium without successive treatments and higher loading values can clog the pores of the activated carbon substrate upon which the impregnation is taking place. The surface area of the activated carbon of the novel homogenous adsorbent of the present invention is controlled by the carbonaceous organic material used and the particular heat treating conditions used.

The mixture of carbonaceous organic material, zirconium or hafnium compound, and phosphoric acid or phosphate salt typically includes water provided from aqueous phosphoric acid or an additional source of water which water conventionally is used in activated carbon processing for handling of materials and providing desired adsorbent shapes. The proportion of zirconium or hafnium compound included in the mixture is adequate to provide the desired proportion of zirconium or hafnium phosphate in the homogenous adsorbent product. The proportion of phosphoric acid should be sufficient to convert the zirconium (or hafnium) salt to its phosphate as well as an additional amount ranging from about 0.5 to about 2.5 weight proportions of acid to carbonaceous organic material. Such additional phosphoric acid ensures the complete conversion of zirconium or hafnium salt to its phosphate as well as provides chemical activation of the adsorbent, such as described in U.S. Pat. No. 3,864,277, cited above. The resulting mixture may be formed into a free-flowing granular product or can be formed into desired shapes by bead formation, extrusion, pelletizing, or like operation. Regardless of the shape, a homogenous mixture of activated carbon precursor and zirconium or hafnium phosphate precursor exists.

The mixture then is heat-treated under conditions for the in situ and essentially simultaneous conversion of the carbonaceous material into activated carbon and the conversion of the hafnium or zirconium compound into its corresponding phosphate. Such heat-treatment generally is conducted in an oxygen or an air environment at an elevated temperature ranging above about 350° C. A preferred temperature range is between about 450° and 550° C. The conversion of the carbonaceous organic material into activated carbon is a well known process and further details about it need not be given here.

The precise structure of the phosphate salt formed is not well known. For example, zirconium phosphate has been reported to exist in at least 10 crystalline phases. Moreover, zirconium phosphate typically exists as a hydrate having from between about 0.1 moles of water at 700° C. to about 2 moles of water at 120° C. For present purposes, the precise structure of the resulting zirconium or hafnium phosphate is not a limitation of the present invention and all forms of such phosphate salts are included within the precepts of the present invention.

The resulting homogenous adsorbent may be hygroscopic and contain excess phosphoric acid and/or phosphorous pentoxide. The excess phosphoric acid and/or phosphorous pentoxide may be washed out with water for forming additional phosphoric acid solution for reuse in the process. Upon washing, the product comprises activated carbon and near-insoluble zirconium phosphate (or hafnium phosphate) in hydrated form. The product may be dried to a required moisture content for ease of handling and/or for particular uses. Because the adsorbent most often is used liquid phase processes, complete drying of the product is not required. The porosity of the homogenous product generally ranges from about 0.2 to 0.8 ml/g and is an intrinsic mixture of the simultaneous in situ production of activated carbon and zirconium or hafnium phosphate.

It should be noted that the resulting homogeneous product may be treated for re-oxidation of the zirconium or hafnium phosphate or conversion to another form if desired. Besides finding wide use in separation processes as described above, it is possible that the novel homogenous product of the present invention may find particular use in the treatment of renal disease. In this regard, zirconium oxide has been reported to be useful in combination with activated charcoal for the adsorption of oxylic acid and glyoxylic acid. Scholtens et al., "In Vitro Adsorption of Oxylic Acid and Glyoxylic Acid into Activated Charcoal, Resins and Hydrous Zirconium Oxide", *The International Journal of Artificial Organs*, Vol. 5, No. 1, pp 33–36 (1982). Zirconium phosphate also has been reported to be useful in the regeneration of sorbents used in artificial kidneys. Maxwell et al., "Sorbents in the Treatment of Chronic Renal Disease", *Kidney International*, Vol. 7, pp S-383-S-386 (1975). Additional medical and non-medical applications may be benefitted by the unique homogenous adsorbent of the present invention.

The following examples show how the present invention can be practiced but should not be construed as limiting. In this application, all units are in the metric system and all proportions and percentages are by weight, unless otherwise expressly indicated. Also, all references cited herein are expressly incorporated herein by reference.

EXAMPLES

EXAMPLE 1

An adsorbent containing approximately an equal weight mixture of activated carbon and zirconium phosphate was made by mixing 1,000 grams of finely divided sawdust with 150 grams of finely powdered zirconium oxide. To this mixture was added 2,000 grams of aqueous phosphoric acid (70% concentration). The resulting mixture was formed into desired shapes and fired in an air atmosphere for 2 hours at 450° C. The fired product was cooled and washed with water until excess phosphoric acid was removed. The product then was dried at 150° C. to remove excess moisture. The dried product was a homogeneous or intrinsic mixture of zirconium phosphate and activated carbon in approximately equal weight proportions. The product possessed both adsorptive and ion exchange capacity. The $CCl_4$ adsorption capacity (ASTM D3467) of the product was 35% and the cation exchange capacity for cesium was in excess of 30 milligrams per gram of adsorbent.

EXAMPLE 2

An approximate equal weight homogenous activated carbon/zirconium phosphate adsorbent was made by mixing 1,000 grams of coarse sawdust, 300 grams of zirconyl chloride, and 1,700 grams of aqueous phosphoric acid (75% concentration). These ingredients were intimately mixed and then fired in an air atmosphere for 2 hours at 450° C. The resulting product was cooled and washed with water to remove excess phosphoric acid. The washed adsorbent then was dried at 150° C. to remove excess moisture. The resulting product was an intrinsic mixture of zirconium phosphate and activated carbon having both adsorptive and ion exchange capacities. The $CCl_4$ adsorption capacity was 47% and the cation exchange capacity for cesium was in excess of 40 mg/grams of adsorbent.

EXAMPLE 3

Another equal weight homogenous zirconium phosphate/activated carbon adsorbent was made from 700 grams starch, 300 grams powdered sugar, 300 grams zirconyl chloride, and 1,200 grams of aqueous phosphoric acid. This mixture was formed into spherical particles in a high shear blender. The resultant beads then were fired in a rotary furnace in an air atmosphere at 500° C. for 1.5 hours. The product was cooled, washed with water to remove excess phosphoric acid, and dried at 150° C. to remove excess moisture. The resulting product was an intrinsic mixture of zirconium phosphate and activated carbon in approximately equal weight proportions. The product had both adsorptive and ion exchange capacity as shown by its $CCl_4$ adsorption capacity of 40% and its carbon exchange capacity for cesium of in excess of 35 mg/gram of adsorbent.

I claim:

1. A method for preparing a homogenous activated carbon/zirconium phosphate or hafnium phosphate product in situ which comprises:
    (a) mixing a carbonaceous organic material, a zirconium or hafnium compound, and phosphoric acid or a phosphate salt; and
    (b) heat-treating said mixture under conditions to convert said carbonaceous material into activated carbon and to convert said zirconium or hafnium compound into zirconium phosphate or hafnium phosphate.

2. The method of claim 1 wherein a zirconium compound is used in said mixture.

3. The method of claim 1 wherein said zirconium or hafnium compound is a salt of zirconium or hafnium.

4. The method of claim 3 wherein said compound is a halide or oxide of zirconium or hafnium.

5. The method of claim 1 wherein said heat-treating is conducted in air at a temperature of not less than about 350° C.

6. The method of claim 5 wherein said heat-treatment is conducted at a temperature of between about 450° and 550° C.

7. The method of claim 1 wherein said heat-treated mixture is washed with water to remove excess phosphoric acid.

8. The method of claim 7 wherein said washed product is dried to a desired moisture content.

9. The method of claim 1 wherein said mixture is formed into a desired shape prior to said heat-treating.

10. The method of claim 1 wherein phosphoric acid is used in said mixture in a proportion of that required to convert said zirconium or hafnium compound to its corresponding phosphate and an excess ranging from about 0.5 to about 2.5 times the weight of said carbonaceous organic material.

* * * * *